United States Patent [19]
Davison et al.

[11] 3,836,158
[45] Sept. 17, 1974

[54] PACKING RING

[75] Inventors: Clifford C. Davison, Pittsburgh, Pa.;
Reinhold A. Ott, Long Beach, Calif.

[73] Assignee: Gulf Oil Corporation, Pittsburgh, Pa.

[22] Filed: Mar. 7, 1973

[21] Appl. No.: 338,904

[52] U.S. Cl.................. 277/146, 277/154, 277/199
[51] Int. Cl............................................. F16j 15/24
[58] Field of Search ........... 277/146, 151, 153, 154, 277/180, 199, 192, 155–159

[56] References Cited
UNITED STATES PATENTS

| | | | |
|---|---|---|---|
| 639,722 | 12/1899 | France................................ | 277/199 |
| 1,148,600 | 8/1915 | Lucke................................. | 277/199 |
| 1,655,853 | 1/1928 | Badeker............................. | 277/146 |
| 1,967,573 | 7/1934 | Fox..................................... | 277/199 |
| 2,885,249 | 5/1959 | Payne................................. | 277/154 |
| 3,271,037 | 9/1966 | Hammond......................... | 277/154 |
| 3,305,241 | 2/1967 | Hart................................... | 277/199 |

FOREIGN PATENTS OR APPLICATIONS

| | | | |
|---|---|---|---|
| 670,499 | 12/1938 | Germany............................ | 277/154 |
| 685,114 | 11/1939 | Germany............................ | 277/154 |
| 1,059,298 | 2/1967 | Great Britain..................... | 277/154 |

*Primary Examiner*—Louis R. Prince
*Assistant Examiner*—Robert I. Smith

[57] ABSTRACT

A reciprocating action rod is equipped with a packing ring positioned around the rod to prevent the escaping of fluids, said packing ring comprising a plurality of generally arcuately-shaped sections containing pin stop members positioned therein to limit the inward movement of the ring sections and so prevent damage to the reciprocating rod.

3 Claims, 4 Drawing Figures

PATENTED SEP 17 1974        3,836,158

PACKING RING

BACKGROUND OF THE INVENTION

Conventionally, compressors, pumps and like equipment utilize reciprocating action rods equipped with packing rings positioned around the rod to prevent the escape of liquids or gases. The packing rings presently employed in, for example, the operation of compressors tend to wear rapidly in continuous operation. As the packing rings are normally held in position by a garter spring, the rod shaft becomes deformed or scored from the rubbing of the garter spring after the packing ring has worn to the point that the spring comes in direct contact with the reciprocating rod.

Accordingly, the object of the invention is to provide an improved packing ring for reciprocating action rods.

Another object of the invention is to provide a sealing packing ring for a reciprocating action rod wherein the life of the packing ring is substantially extended.

Another object of the invention is to provide a packing ring for reciprocating action rods wherein the scoring of the reciprocating action rod is prevented.

Other objects, advantages and features of this invention will be readily apparent to those skilled in the art from the following description, drawing and appended claims.

SUMMARY OF THE INVENTION

By the invention we have provided a packing ring comprising a plurality of generally arcuately-shaped chordally-cut sections assembled end to end in a manner to control reduction of the diameter of the cylindrical surfaces with wear of the packing ring so as to prohibit scoring of the reciprocating rod by action of an outer spring normally holding the sections of the packing ring in assembled relationship.

DESCRIPTION OF THE INVENTION

Figure 1:
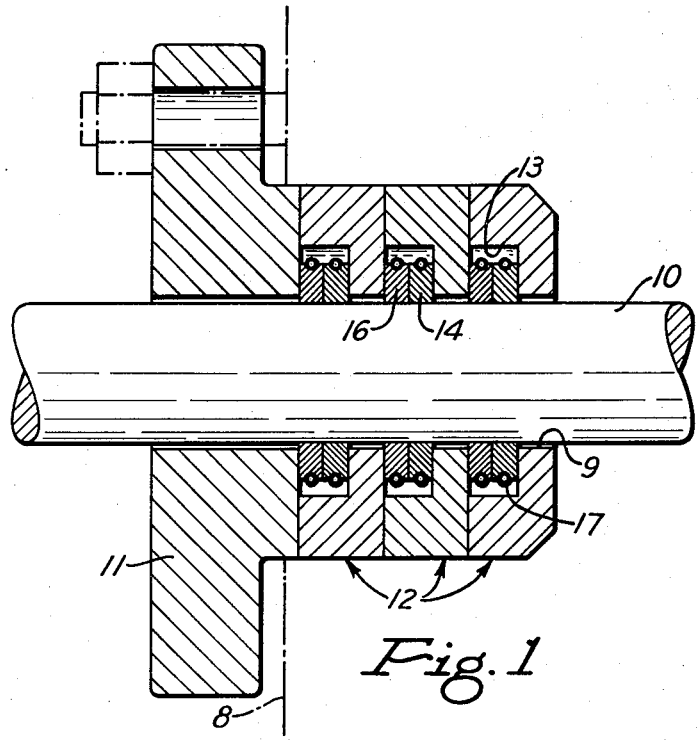
FIG. 1 is a cross sectional view of 3 packing rings, each in assembled relationship with a back-up ring, and positioned by means of annular cup members in sealing relationship to a reciprocating rod.

Referring to the drawing, the sealing function of the inventive packing ring is shown in FIG. 1 in conjunction with a cylinder wall 8 having an opening 9 therein through which a reciprocating rod 10 extends. A gland recess is provided in the outer face of the cylinder wall 8 surrounding the opening 9. Annular cup members 12, each of which contains a recess 13, is positioned about reciprocating rod 10 within the glandular recess and maintained in the recess by a retaining ring 11.

As illustrated in FIG. 1, each recess 13 contains a pair of rings 14 and 16. Each ring is comprised of a number of sections, as hereafter described, with the sections held in assembled relationship about reciprocating rod 10 by a conventional spring such as a garter spring 17. Although not to be limited thereto, normally the inner ring 14 is the novel packing ring of this invention. Three pairs of packing rings are illustrated in FIG. 1 but it is within the scope of this invention to employ additional pairs of packing rings if desired.

Figure 2:
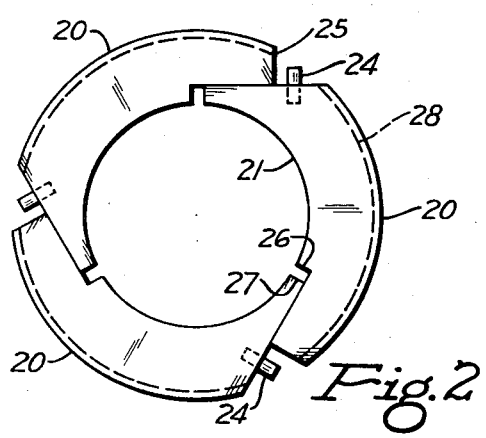
FIG. 2 is a front elevational view of the novel packing ring.

Referring to FIG. 2, there is shown the novel packing ring of this invention which has been cut chordally into sections 20. This packing ring is the primary sealing element for the reciprocating action rod 10. The packing ring is cut to provide abutting chordal surfaces 22 and 23 (FIG. 3) which are maintained in sliding, sealing relationship by the action of spring 17 positioned within groove 28. The ring is cut so that each of the chordal surfaces when positioned in assembled relationship to the reciprocating rod 10 falls on the side of an equilateral triangle with the chordal sliding surfaces maintaining sealing contact with variations in the inside diameter of the packing ring. As wear occurs during the action of the reciprocating rod 10, the packing ring closes radially inward while maintaining the seal between the packing ring and reciprocating rod 10.

Figure 3:
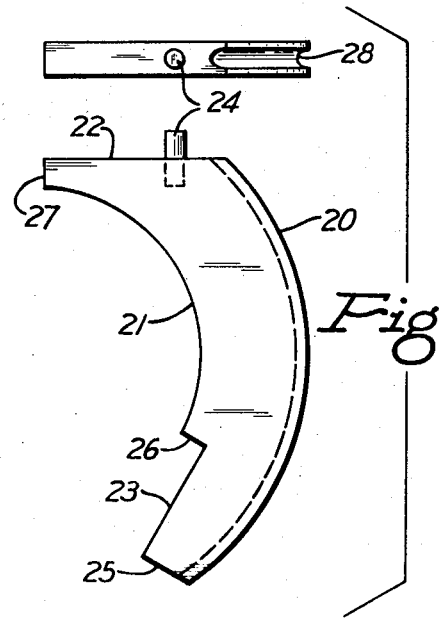
FIG. 3 shows a front elevational and a top view of one section of the novel packing ring.

A pin-stop member 24 is positioned in the chordal surface of each of sections 20 as illustrated in FIGS. 2 and 3. The pin member 24 is positioned so as to control the inward movement of the inner and outer cylindrical surfaces of packing ring 14. Normally, the pin member is positioned such that wear upon the inner surfaces 21 of sections 20 will be limited to prohibit spring 17 from coming into direct contact with reciprocating action rod 10. The pin 24 can be made of a variety of metals such as aluminum, bronze, nylon and the like.

Preferably, each chordal surface is provided with shoulders 25, 26 and 27. Shoulders 26 and 27 are formed such that when sections 20 are in assembled relationship, adjacent shoulders 26 and 27 are in substantially parallel relationship to each other and the radius of the packing ring. In preferred operation, pin-stop member 24 is positioned such that as the sections 20 move inwardly with wear, the gap between adjacent shoulders 26 and 27 narrows until sealing contact is made between the shoulders. At this point, pin-stop member 24 is positioned immediately adjacent to and in contact with shoulder 25. Although not to be limited thereto, shoulder 25 is preferably in a plane substantially perpendicular to adjacent chordal surfaces 22 and 23.

Figure 4:
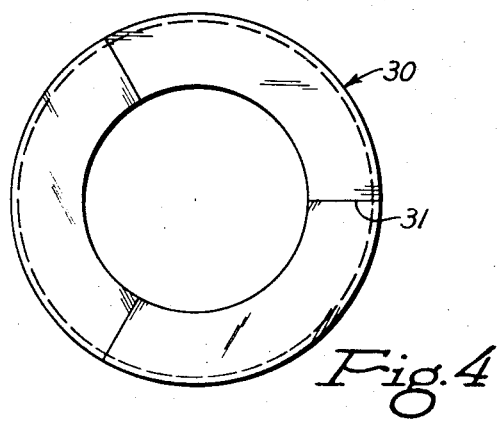
FIG. 4 is a front elevational view of the back-up ring.

In FIG. 4, there is illustrated a conventional back-up packing ring comprised of sections 30 joined end-to-end. In forming the back-up packing ring the ring has been cut radially, forming adjacent sealing surfaces 31 when held in position by spring member 17. The back-up packing ring is positioned so as to seal the gaps in the chordally-cut packing ring. Under some conditions, it is desirable to employ a second back-up ring which is then used in combination with each illustrated packing ring pair.

The novel packing ring of this invention can be fabricated from a variety of materials such as cast iron, bronze, babbitt, carbon/graphite, carbon/bakelite, filled tetrafluoroethylene plastic compositions, and the like.

As previously noted, when the pin-stop member 24 comes into contact with shoulder 25, the radial closing of the packing ring ceases. At this point, the particular packing ring will no longer seal around the rod 10 as the rod continues to operate but the packing ring will continue to act as a pressure breaker. The actual seal will be assumed by another of the chordally-cut packing rings. In operation it has been observed that while a packing assembly generally consists of a series of packing ring pairs, the actual seal is being accomplished by only one pair at any particular given time.

As evidence of the value of the novel packing ring, compressors employed in non-lubricating service had experienced packing ring failures and piston rod damage on an average of every 5 months. By employing the same packing material - filled tetrafluoroethylene - on the same machines in the same service, but with the improved pin-lock design, the life of the packing has been extended by more than 100 percent.

Although the invention has been described with reference to specific embodiments, references, and details, various modifications and changes will be apparent to one skilled in the art and are contemplated to be embraced in this invention.

We claim:

1. A packing ring comprising a plurality of generally arcuately-shaped sections which when assembled end to end define radially inner and outer cylindrical surfaces and annular side surfaces at least one of which is subjected to pressure, the ends of such sections having chordal sealing surfaces for sliding abutment with each other, one end of said chordal surfaces terminating adjacent said cylindrical surfaces in a manner permitting reduction of the diameters of said cylindrical surfaces, a pin stop member extending outwardly from each radially inner chordal sealing surface in a manner to limit reduction of the diameters of said cylindrical surfaces, and an outer spring holding said sections in assembled relationship.

2. The packing ring of claim 1 wherein each section further comprises shoulders which terminate at the inner cylindrial surface and coincide with the radii extending thereto.

3. The packing ring of claim 2 wherein each said pin stop member is positioned so as to permit said sections to move inwardly until said shoulders of adjacent sections are in abutting sealing relationship.

* * * * *